United States Patent
Okada

(10) Patent No.: US 7,413,051 B2
(45) Date of Patent: Aug. 19, 2008

(54) ELECTRIC POWER STEERING APPARATUS

(75) Inventor: Jun Okada, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 210 days.

(21) Appl. No.: 11/083,987

(22) Filed: Mar. 21, 2005

(65) Prior Publication Data

US 2005/0217924 A1    Oct. 6, 2005

(30) Foreign Application Priority Data

Mar. 22, 2004    (JP)    ............ P.2004-082453

(51) Int. Cl.
   *B64D 5/04*    (2006.01)
(52) U.S. Cl. .................. 180/444; 180/446; 74/388 PS
(58) Field of Classification Search ................ 180/444; 74/388 PS
   See application file for complete search history.

(56) References Cited

U.S. PATENT DOCUMENTS

| | | | | |
|---|---|---|---|---|
| 3,180,233 | A | * | 4/1965 | Jablonsky .................. 91/374 |
| 3,824,905 | A | | 7/1974 | Jablonsky |
| 4,415,054 | A | * | 11/1983 | Drutchas .................. 180/444 |
| 4,593,780 | A | * | 6/1986 | Saito .................. 180/444 |
| 4,773,497 | A | * | 9/1988 | Carlson et al. ............. 180/444 |
| 5,711,396 | A | | 1/1998 | Jeorg et al. |
| 6,186,268 | B1 | * | 2/2001 | Onodera et al. ............. 180/444 |
| 6,464,034 | B1 | | 10/2002 | Toda et al. |
| 6,644,432 | B1 | | 11/2003 | Yost et al. |
| 7,044,263 | B2 | * | 5/2006 | Fischbach et al. ........... 180/444 |
| 2002/0096388 | A1 | | 7/2002 | Fujiwara et al. |
| 2002/0148672 | A1 | | 10/2002 | Tatewaki et al. |
| 2003/0066372 | A1 | * | 4/2003 | Kobayashi et al. ....... 74/424.82 |
| 2004/0020317 | A1 | * | 2/2004 | Yamamoto ............. 74/388 PS |

FOREIGN PATENT DOCUMENTS

| | | |
|---|---|---|
| DE | 37 09 590 A1 | 10/1987 |
| DE | 103 04 189 A1 | 9/2003 |
| EP | 0 253 735 A1 | 1/1988 |
| EP | 1 026 067 A2 | 8/2000 |
| EP | 1 357 012 A1 | 10/2003 |
| EP | 1 403 169 A2 | 3/2004 |
| JP | 6-504 B2 | 1/1994 |
| JP | 2000-255437 A | 9/2000 |
| JP | 2002-308123 A | 10/2002 |

* cited by examiner

*Primary Examiner*—Lesley D. Morris
*Assistant Examiner*—Marlon Arce-Diaz
(74) *Attorney, Agent, or Firm*—Sughrue Mion, PLLC

(57) ABSTRACT

Since a nut 45 is provided with paths for connecting rolling paths 23b, 45f and circulating paths 45c, that is, return paths 45d at end caps 45b, 45b attached to both ends of a main body 45a, a receiving portion for receiving power transmitted from an electric motor 35, that is, a driven gear portions 45e is provided at a center of an outer peripheral face on outer sides in a radius direction of the rolling paths and therefore, when power is transmitted from the electric motor 35 to the driven gear portion 45e, smooth operation can be carried out by restraining the nut 45 from being twisted.

8 Claims, 6 Drawing Sheets

ELECTRIC POWER STEERING APPARATUS

BACKGROUND OF THE INVENTION

The present invention relates to an electric power steering apparatus having a ball screw mechanism.

There is known an electric power steering apparatus for driving an electric motor in accordance with a steering torque to assist steering by transmitting a rotational force of the electric motor to a rack shaft. Here, there is a case of using a ball screw mechanism for converting the rotational force of the electric motor into a thrust force of the rack shaft (refer to Patent Reference 1).

[Patent Reference 1]

Examined Japanese Patent Application Publication No. Hei6-504

Meanwhile, according to the electric power steering apparatus described in Patent Reference 1, a gear is integrally formed with an outer periphery of a nut of the ball screw mechanism and power of the electric motor is transmitted to the nut of the electric motor via the gear. Although when the nut and the screw shaft are rotated relative to each other, there is needed a circulating path for returning a ball from one end to other end of a rolling path, nothing is disclosed in Patent Reference 1 with regard to the circulating path. Therefore, it seems that a tube or a frame which is a general circulating path is used. However, when the gear is formed at the outer periphery of the nut, it is difficult to arrange the tube or the frame to ride over the gear. Therefore, it is to be conceived that the gear of the nut is arranged to displace from the rolling path to an outer side in an axis line direction according to the electric power steering apparatus disclosed in Patent Reference 1 regardless of drawings of Patent Reference 1.

However, when it is conceived that the gear of the nut is arranged to displace from the rolling path to the outer side in the axis line direction, a torque transmitted from the electric motor is inputted to one end of the nut and therefore, the nut is liable to be twisted and power cannot be transmitted smoothly. Further, although when a large torque is transmitted, a tooth width of a gear is to be increased in order to reduce a face pressure of a tooth face, thereby, a length of the nut in the axis line direction is increased to pose also a problem that compact formation of the electric power steering apparatus cannot be achieved.

SUMMARY OF THE INVENTION

The invention is carried out in view of the problem of the background art and it is an object thereof to provide an electric power steering apparatus capable of ensuring to operate smoothly while achieving compact formation.

According to the first aspect of the present invention, there is provided an electric power steering apparatus including:

an electric motor;

a rack shaft connected to a steering mechanism and arranged in parallel with an axis line of the electric motor; and a power transmitting mechanism for transmitting a power from the electric motor to the rack shaft, wherein the power transmitting mechanism includes:

a screw shaft connected or integrated to the rack shaft and having a male screw groove;

a nut arranged at a surrounding of the screw shaft and having a female screw groove; and a plurality of rolling members rotatable in a rolling path formed between the male screw groove and the female screw groove, and the nut includes:

a main body provided with a receiving portion for receiving the power transmitted from the electric motor on an outer side in a radius direction of the rolling path and provided with a circulating path of the rolling member extended in an axis line direction; and end caps provided at both ends of the main body and provided with paths for connecting the rolling path and the circulating path.

According to the second aspect of the present invention, there is provided the electric power steering apparatus according to the first aspect, wherein the receiving portion is a gear portion formed at an outer peripheral face of the nut.

According to the third aspect of the present invention, there is provided the electric power steering apparatus according to the first aspect, wherein the receiving portion is a gear portion formed at a driven member fitted to an outer peripheral face of the nut.

According to the forth aspect of the present invention, there is provided the electric power steering apparatus according to the third aspect, wherein the nut and the driven member are coupled via a serration.

According to the fifth aspect of the present invention, there is provided the electric power steering apparatus according to the third aspect, wherein a portion of the main body of the nut surrounding the circulating path is projected from the outer peripheral face in a cylindrical shape in the radius direction, and an inner peripheral face of the driven member is recessed to be opposed to the portion surrounding the circulating path.

According to the sixth aspect of the present invention, there is provided the electric power steering apparatus according to any one of the third aspect through the fifth aspect, wherein the nut and the driven member are coupled displaceably in the axis line direction via an elastic member.

DETAILED DESCRIPTION OF THE PREFERRED EMBODIMENTS

Figure 1:
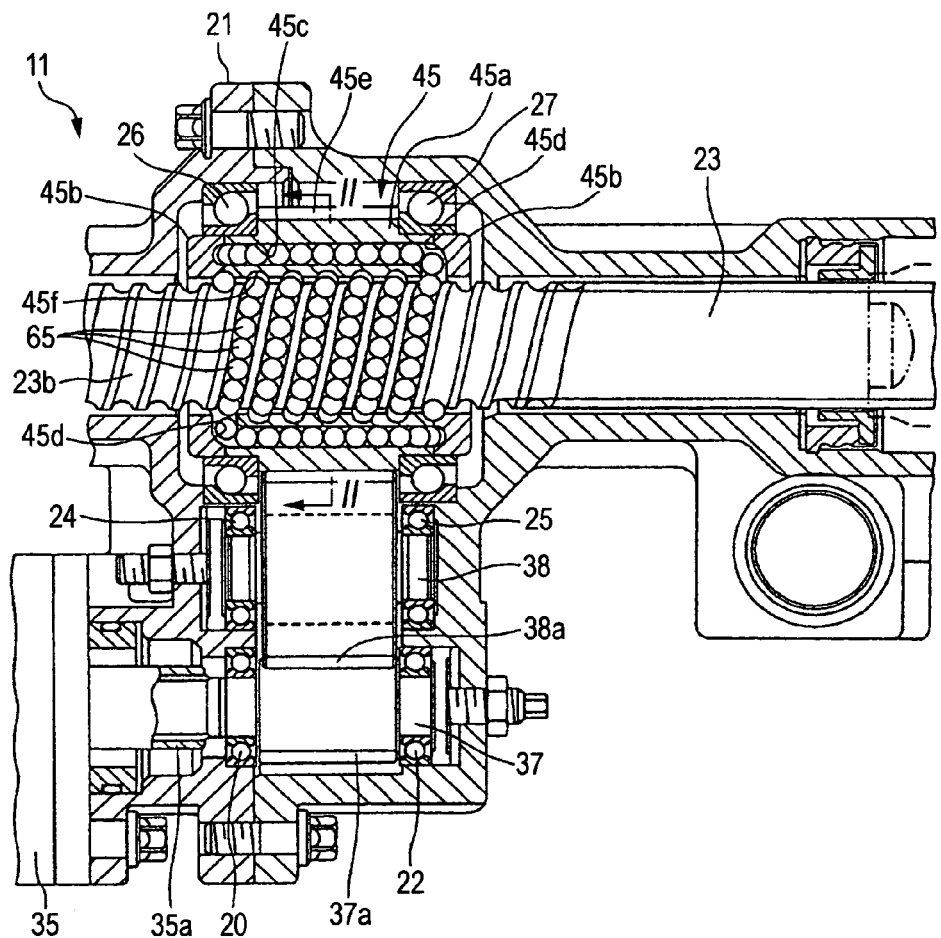
FIG. 1 is a sectional view of an essential portion of an electric power steering apparatus according to a first embodiment.
Figure 2:
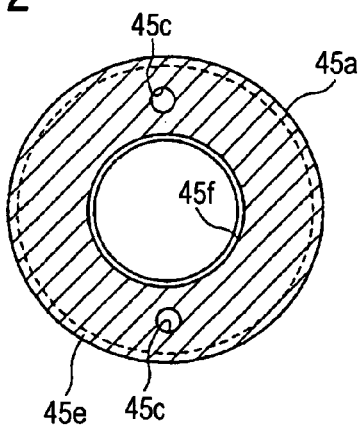
FIG. 2 is a view viewing a nut of FIG. 1 in an arrow mark direction by cutting the nut by a line II-II.

Embodiments of the invention will be explained in reference to drawings as follows. FIG. 1 is a sectional view of an essential portion of an electric power steering apparatus according to a first embodiment. FIG. 2 is a view viewing the nut of FIG. 1 in an arrow mark direction by cutting the nut by a line II-II, in which a screw shaft and a ball are omitted. In FIG. 1, an electric power steering apparatus 11 includes a housing 21 fixed to a vehicle body, not illustrated. A rack shaft 23 is supported by the housing 21 movably in an axis line direction to penetrate the housing 21 horizontally. Although not illustrated, a pinion is formed at a lower end of an input shaft connected to a steering wheel and is brought in mesh with rack teeth of the rack shaft 23 and the rack teeth 23 is moved in a left and right direction in the drawing. Both ends of the rack shaft 23 is connected to a tie rod (not illustrated) of a steering mechanism.

An electric motor 35 is attached to the housing 21 such that an axis line thereof is in parallel with the rack shaft 23. An output shaft 35a of the electric motor 35 is fixed to a drive shaft 37 relatively displaceably in an axis line direction and integrally in a rotational direction by serration coupling. The drive shaft 37 is rotatably supported by the housing 21 by bearings 20, 22 and includes a drive gear portion 37a at a portion thereof interposed by the bearings 20, 22.

A middle shaft 38 is arranged between the drive shaft 37 and the rack shaft 23. The middle shaft 38 is rotatably supported by the housing 21 by bearings 24, 25 and includes a middle gear portion 38a brought in mesh with the drive gear portion 37a.

A nut 45 is arranged at a surrounding of the rack shaft 23 and is supported by the housing 21 rotatably by bearings 26, 27. The nut 45 includes a main body 45a in a shape of a hollow cylinder at a center thereof and end caps 45b, 45b at both ends thereof. The main body 45a is formed with two pieces of circulating paths 45c penetrated in an axis line direction (refer to FIG. 2) and formed with return paths (paths) 45d, 45d connecting rolling paths thereof, mentioned later, to the circulating paths 45c. Further, a driven gear portion (receiving portion) 45e brought in mesh with the middle gear portion 38a is provided at a portion of the main body 45a interposed by the bearings 26, 27. A gear pair is constituted by the drive gear portion 37a, the middle gear portion 38a and the driven gear portion 45e.

A male screw groove 23b is formed at a portion of an outer peripheral face of the rack shaft 23 integral with the screw shaft (a separate parts may be connected thereto). The nut 45 is arranged at a surrounding of the male screw groove 23b, and a female screw groove 45f is formed at an inner peripheral face of the main body 45a opposed to the male screw groove 23b. A number of balls 65 are movably arranged at a space (rolling path) in a spiral shape formed by the male screw groove 23b and the female screw groove 45f.

Operation of the embodiment will be explained. Although not illustrated, when a driver rotates the steering wheel, the rotational force is transmitted to the input shaft. When the input shaft is rotated, the rack teeth brought in mesh therewith by a pinion is pressed, the rack shaft 23 is moved in the axis line direction and the steering mechanism, not illustrated, is driven via the tie rod to thereby steer a wheel.

At this occasion, a torque sensor, not illustrated, detects a steering torque, CPU, not illustrated, supplies power to the electric motor 35 and therefore, the drive gear portion 37a is rotated along with the output shaft, and the gear portion 45e brought in mesh therewith via the middle gear portion 38a is rotated by a predetermined speed reducing ratio. Thereby, also the nut 45 is rotated, and rotational movement thereof is converted into an axis line movement of the rack shaft 23 via the ball 65. By using the force in the axis line direction, the assisting steering force is made to be able to be outputted.

According to the electric power steering apparatus 11 of the embodiment, the nut 45 is provided with paths connecting the rolling paths (23b, 45f) and the circulating paths 45c, that is, return paths at the end caps 45b, 45b provided at the both ends of the main body 45a and therefore, the receiving portion for receiving power transmitted from the electric motor 35, that is, the driven gear portion 45e can be provided at a center of an outer peripheral face on outer sides in a radius direction of the rolling paths and therefore, when power is transmitted from the electric motor 35 to the driven gear portion 45e, smooth operation can be carried out by restraining the nut 45 from being twisted. Further, by providing the driven gear portion 45e for receiving power transmitted from the electric motor 35 at the outer peripheral face on the outer sides in the radius direction of the rolling paths, a length in the axis line direction of the nut 45 can also be restrained.

Figure 3:
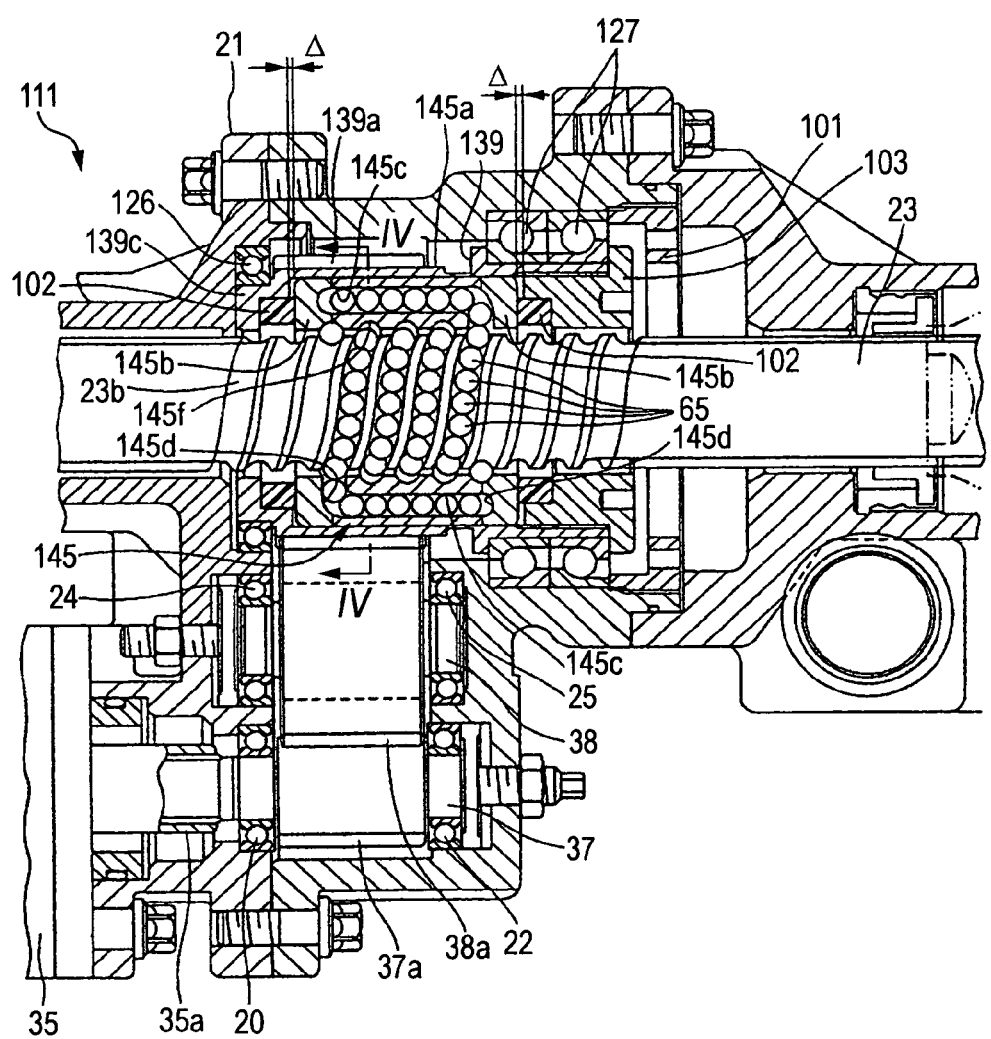
FIG. 3 is a sectional view of an essential portion of an electric power steering apparatus according to a second embodiment.
Figure 4:
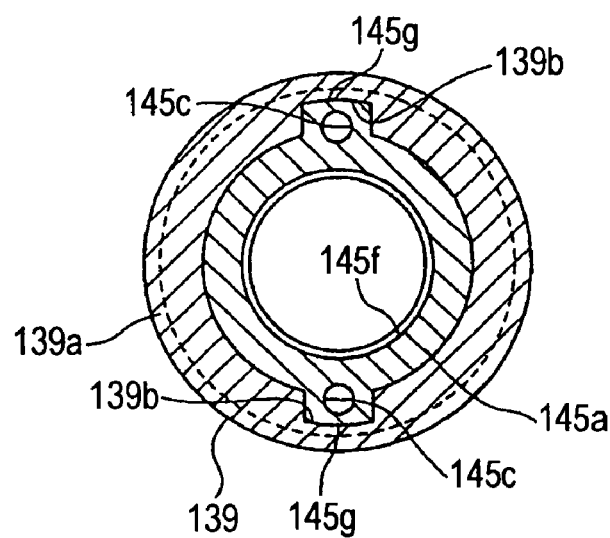
FIG. 4 is a view viewing a nut of FIG. 3 in an arrow mark direction by cutting the nut by a line IV-IV.

FIG. 3 is a sectional view of an essential portion of an electric power steering apparatus according to a second embodiment. FIG. 4 is a view viewing a nut of FIG. 3 in an arrow mark direction by cutting the nut by a line IV-IV, in which a screw shaft and a ball are omitted. With regard to the embodiment, an explanation will be given only a point which differs from the embodiment shown by FIGS. 1, 2, and an explanation will be omitted of a common constitution by attaching the same notation. Further, a nut 145 includes a main body 145a having circulating paths 145c, 145c and end caps 145b, 145b having return paths 145d, 145d similar to the above-described embodiment.

In an electric power steering apparatus 111 shown in FIG. 3, a hollow driven member 139 is arranged at a surrounding of the rack shaft 23. The driven member 139 is rotatably supported by the housing 21 by a bearing 126, and a pair of angular contact ball bearings 127, 127 outer rings of which are fixed by a screw member 101 screwed to the housing 21. The driven member 139 includes a driven gear portion 139a at a portion thereof interposed by the bearing 126 and the bearings 127, 127.

As shown by FIG. 4, the nut 145 is not constituted by a shape of a complete cylinder but is provided with raised portions (receiving portions) 145g, 145g to surround the circulating paths 145c, 145c. In correspondence with the raised portions 145g, 145g, recessed grooves 139b, 139b having substantially a rectangular sectional shape are provided at an inner peripheral face of the driven member 139, and by engaging the raised portions 145g, 145g and the grooves 139b, 139b, the nut 145 is attached to the driven member 139 relatively displaceably in an axis direction and integrally in a rotational direction.

One end (left end in FIG. 3) of the driven member 139 is formed with a flange portion 139c extended to an inner side in a radius direction, and an elastic member 102 made of resin or made of rubber is arranged between the flange portion 139c and the end cap 145b. On the other hand, a pressing member 103 in a shape of a circular disk is screwed to an inner periphery of other end (right end of FIG. 3) of the driven member 139 and the elastic member 102 made of resin or made of rubber is arranged also between the pressing member 103 and the end cap 145b. In a free state shown in FIG. 3, axis line direction clearances of $\Delta$ are present respectively between the end caps 145b, 145b of the nut 145 and an end face of the flange portion 139c and an end face of the pressing member 103.

According to the electric power steering apparatus 111 of the embodiment, power transmitted from the electric motor 35 is transmitted to the nut 145 by the driven member 139 via the grooves 139b, 139b and the raised portions 145g, 145g engaged with each other. Here, the nut 145 is provided with the end caps 145b, 145b attached with paths for connecting the rolling paths (23b, 145f) and the circulating paths 145c, that is, the return paths 145d at both ends of the main body 145a and therefore, receiving portions for receiving power transmitted from the electric motor 35, that is, the raised portions 145g, 145g at an outer peripheral face on outer sides in the radius direction of the rolling paths and therefore, when power is transmitted from the electric motor 35 to the raised portions 145g, 145g, smooth operation can be carried out by restraining the nut 145 from being twisted. Further, by providing the raised portions 145g, 145g for receiving power transmitted from the electric motor 35 at an outer peripheral face on outer sides in the radius direction of the rolling paths, a length in an axis line direction of the nut 145 can also be restrained.

Further, according to the embodiment, when the rack shaft 23 receives a force to abruptly move in the axis line direction by, for example, an impact force inputted from a road face via a wheel, not illustrated, the impact can be alleviated by deforming the elastic members 102 in a direction of reducing the axis line direction clearance Δ between the end cap 145b, 145b of the nut 145 and the end face of the flange portion 139c or the end face of the pressing member 103.

Figure 5:
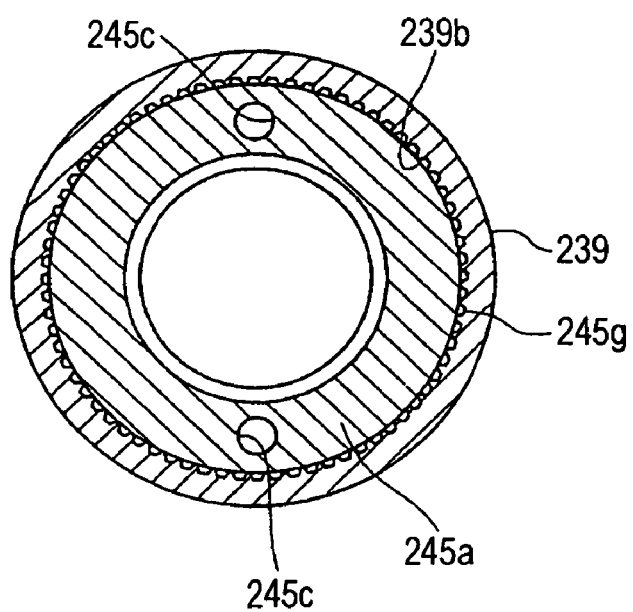
FIG. 5 is a sectional view similar to FIG. 4 according to a third embodiment.

FIG. 5 is a sectional view similar to FIG. 4 according to a third embodiment. The embodiment applicable to the electric power steering apparatus of FIG. 1 or 3 is formed with a male serration 245g at an outer peripheral face of a main body 245a of a nut 245 in a cylindrical shape, and a female serration 239b is formed at an inner peripheral face of a driven member 239 to be opposed thereto. By engaging the male serration 245g and the female serration 239b, the nut 245 is attached to the driven member 239 relatively displaceably in an axis line direction and integrally in a rotational direction. According to the modified example, the outer peripheral face of the main body 245a is constituted by the cylindrical shape and therefore, it is easy to form the serration. Otherwise, a basic effect of the modified example is similar to those of the above-described embodiments.

Figure 6:
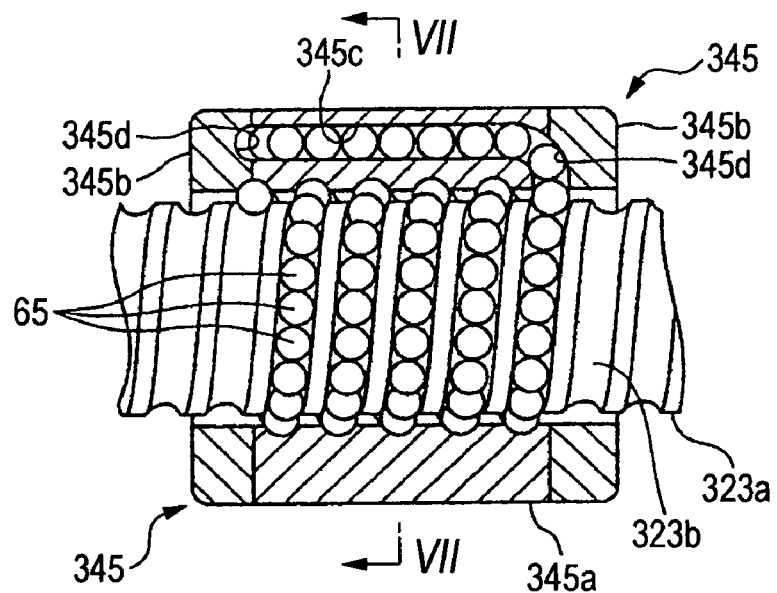
FIG. 6 is a sectional view of a nut and a screw shaft showing other modified example of the embodiment.
Figure 7:
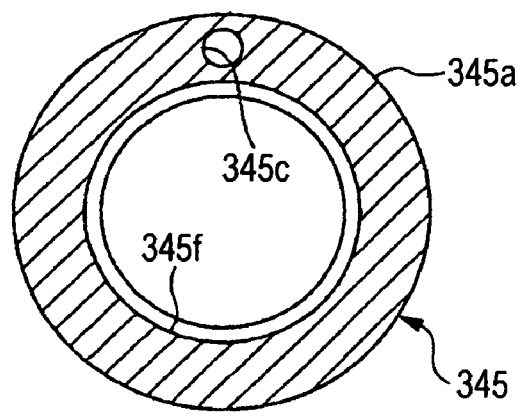
FIG. 7 is a view viewing a constitution of FIG. 6 in an arrow mark direction by cutting the constitution by a line VII-VII.

FIG. 6 is a sectional view of a nut and a screw shaft showing other modified example of the embodiment, and FIG. 7 is a view viewing a constitution of FIG. 6 in an arrow mark direction by cutting the constitution by a line VII-VII, in which a screw shaft and a ball are omitted. Although the modified example corresponds to the embodiment of FIGS. 1, 2, one streak groove (345f, 323b) is adopted for a nut 345 and a screw shaft 323 and therefore, there are provided single ones of a circulating path 345c provided at a main body 345a of the nut 345 and a return path 345d of an end cap 345b.

Figure 8:
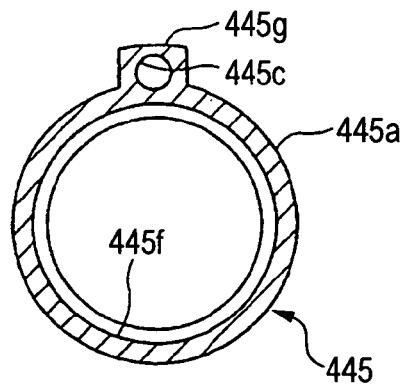
FIG. 8 is a view similar to FIG. 7 according to still other modified example.

FIG. 8 is a view similar to FIG. 7 according to still other modified example. Although the modified example corresponds to the embodiment of FIGS. 3, 4, the nut 445 and a screw shaft (not illustrated) adopt one streak screw groove (445f), therefore, there are single ones of a circulating path 445c and a raised portion 445g provided at the nut 445 and a return path (not illustrated) of an end cap. Further, it is sufficient to form one groove of a driven member, not illustrated, in accordance with the raised portion 445g to be engaged therewith.

Figure 9:
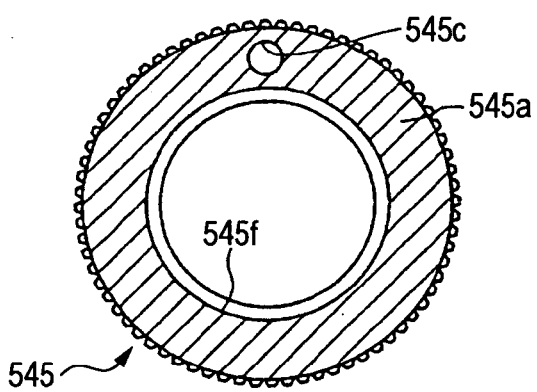
FIG. 9 is a view similar to FIG. 7 according to still other modified example.

FIG. 9 is a view similar to FIG. 7 according to still other modified example. Although the modified example corresponds to the embodiment of FIG. 5, a nut 545 having a male serration and a screw shaft (not illustrated) adopt one streak screw groove (545f) and therefore, there are single ones of a circulating path 545c and a return path (not illustrated) of an end cap provided at the nut 545.

Figure 10:
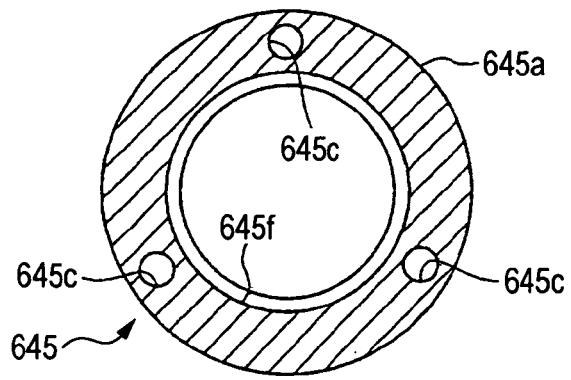
FIG. 10 is a view similar to FIG. 7 according to still other modified example.

FIG. 10 is a view similar to FIG. 7 according to still other modified example. Although the modified example corresponds to the embodiment of FIGS. 1, 2, a nut 645 and a screw shaft (not illustrated) adopt a three streaks screw groove (645f) and therefore, there are respective three of circulating paths 645c provided at the nut 645 and return paths (not illustrated) of the end cap.

Figure 11:
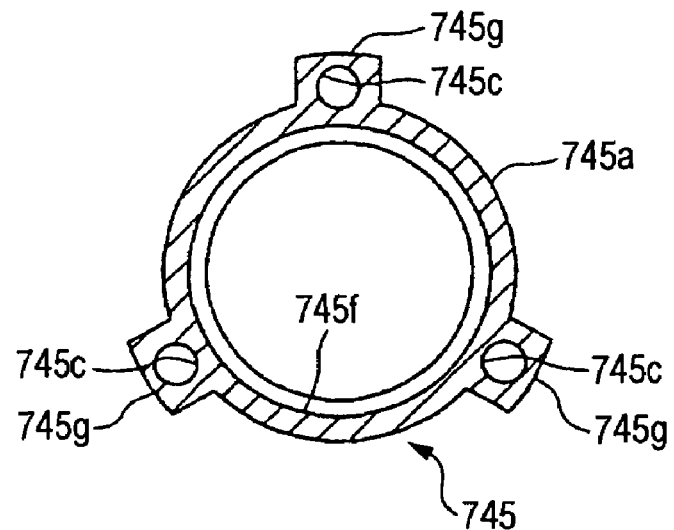
FIG. 11 is a view similar to FIG. 7 according to still other modified example.

FIG. 11 is a views similar to FIG. 7 according to still other modified example. Although the modified example corresponds to the embodiment of FIGS. 3, 4, a nut 745 and a screw shaft (not illustrated) adopt a three streaks screw groove (745f) and therefore, there are respective threes of circulating paths 745c, raised portions 745g and return paths (not illustrated) of an end cap provided at the nut 745. Further, three of grooves of a driven member, not illustrated, are needed in accordance with raised portions 745g to be engaged therewith.

Figure 12:
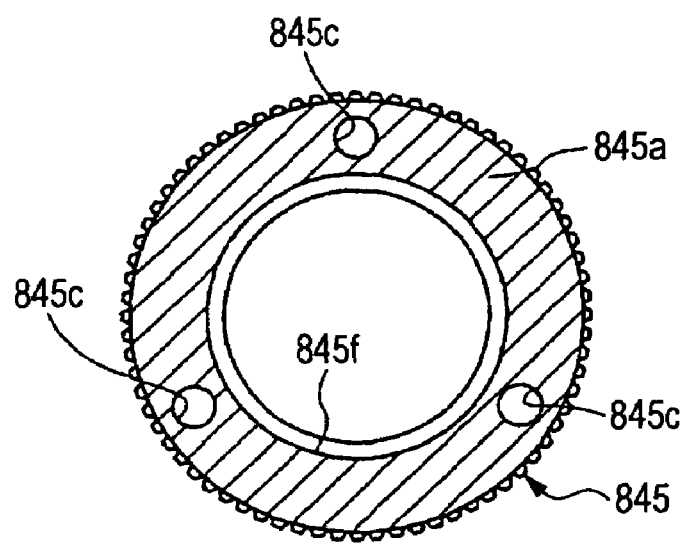
FIG. 12 is a view similar to FIG. 7 according to still other modified example.

FIG. 12 is a view similar to FIG. 7 according to still other modified example. Although the modified example corresponds to the embodiment of FIG. 5, a nut 845 having a male serration and a screw shaft (not illustrated) adopt three streaks screw grooves (845f) and therefore, there are respective threes of circulating paths 845c and return paths (not illustrated) of an end cap provided at the nut 845.

Although a detailed explanation is given of the invention in reference to the embodiments as described above, the invention is not to be interpreted to be limited to the above-described embodiments but can naturally be modified or improved pertinently within the range of not deteriorating a gist thereof.

According to the electric power steering apparatus of the invention, the nut is provided with the paths for connecting the rolling paths and the circulating paths at the caps at both ends of the main body and therefore, the receiving portion for receiving the power transmitted from the electric motor can be provided at the outer peripheral face on the outer sides in the radius direction of the rolling paths or the like and therefore, when power is transmitted from the electric motor to the receiving portion, smooth operation can be carried out by restraining the nut from being twisted. Further, by providing the receiving portion for receiving the power transmitted from the electric motor at the outer peripheral face on the outer sides in the radius direction of the rolling paths or the like, a length in the axis line direction of the nut can also be restrained.

Although it is preferable that the receiving portion is a gear portion formed at the outer peripheral face of the nut and the power from the electric motor is transmitted via a gear pair, the power may also be transmitted via a toothed belt or a chain.

It is preferable that the receiving portion is a gear portion formed at a driven member fitted to an outer peripheral face of the nut.

Although it is preferable that the nut and the driven member are coupled via a serration, the nut and the driven member may be fitted by press-fitting or the like.

It is preferable that a portion of the main body of the nut surrounding the circulating path is formed to project from the outer peripheral face in a cylindrical shape in a radius direction and an inner peripheral face of the driven member is recessed to be opposed to the portion surrounding the circulating path.

It is preferable that the nut and the driven member is coupled displaceably in the axis line direction via an elastic member since a relative displacement in the axis line direction of the nut and the driven member can be absorbed by deforming the elastic member.

What is claimed is:

1. An electric power steering apparatus comprising:
an electric motor;
a rack shaft connected to a steering mechanism and arranged in parallel with an axis line of the electric motor; and
a power transmitting mechanism for transmitting a power from the electric motor to the rack shaft, wherein
the power transmitting mechanism includes:
a screw shaft connected or integrated to the rack shaft and having a male screw groove;
a nut arranged at a surrounding of the screw shaft and having a female screw groove; and
a plurality of rolling members rotatable in a rolling path formed between the male screw groove and the female screw groove, and
the nut includes:
a main body provided with a receiving portion for receiving the power transmitted from the electric motor on an outer side in a radius direction of the rolling path and provided with a circulating path of the rolling member extended in an axis line direction; and
end caps, each of which is constituted by only one part, respectively provided at both ends of the main body along a longitudinal axis of the nut with respect to a mount portion machined parallel to the longitudinal axis of the nut, and provided with paths for connecting the rolling path and the circulating path.

2. The electric power steering apparatus according to claim 1, wherein the receiving portion is a gear portion formed at an outer peripheral face of the nut.

3. The electric power steering apparatus according to claim 1, wherein the receiving portion is a gear portion formed at a driven member fitted to an outer peripheral face of the nut.

4. The electric power steering apparatus according to claim 3, wherein the nut and the driven member are coupled via a serration.

5. The electric power steering apparatus according to claim 3, wherein a portion of the main body of the nut surrounding the circulating path is projected from the outer peripheral face in a cylindrical shape in the radius direction, and an inner peripheral face of the driven member is recessed to be opposed to the portion surrounding the circulating path.

6. The electric power steering apparatus according to claim 3, wherein the nut and the driven member are coupled displaceably in the axis line direction via an elastic member.

7. An electric power steering apparatus comprising:
an electric motor;
a rack shaft connected to a steering mechanism and arranged in parallel with an axis line of the electric motor; and
a power transmitting mechanism for transmitting a power from the electric motor to the rack shaft, wherein
the power transmitting mechanism includes:
a screw shaft connected or integrated to the rack shaft and having a male screw groove;
a nut arranged at a surrounding of the screw shaft and having a female screw groove; and
a plurality of rolling members rotatable in a rolling path formed between the male screw groove and the female screw groove, and
the nut includes:
a main body provided with a receiving portion for receiving the power transmitted from the electric motor on an outer side in a radius direction of the rolling path and provided with a circulating path of the rolling member extended in an axis line direction; and
end caps provided at both ends of the main body and provided with paths for connecting the rolling path and the circulating path,
wherein the receiving portion is a gear portion formed at a driven member fitted to an outer peripheral face of the nut;
wherein a portion of the main body of the nut surrounding the circulating path is projected from the outer peripheral face in a cylindrical shape in the radius direction, and
wherein an inner peripheral face of the driven member is recessed to be opposed to the portion surrounding the circulating path.

8. An electric power steering apparatus comprising:
an electric motor;
a rack shaft connected to a steering mechanism and arranged in parallel with an axis line of the electric motor; and
a power transmitting mechanism for transmitting a power from the electric motor to the rack shaft, wherein
the power transmitting mechanism includes:
a screw shaft connected or integrated to the rack shaft and having a male screw groove;
a nut arranged at a surrounding of the screw shaft and having a female screw groove; and
a plurality of rolling members rotatable in a rolling path formed between the male screw groove and the female screw groove, and
the nut includes:
a main body provided with a receiving portion for receiving the power transmitted from the electric motor on an outer side in a radius direction of the rolling path and provided with a circulating path of the rolling member extended in an axis line direction; and
end caps provided at both ends of the main body and provided with paths for connecting the rolling path and the circulating path;
wherein the receiving portion is a gear portion formed at a driven member fitted to an outer peripheral face of the nut; and
wherein the nut and the driven member are coupled displaceably in the axis line direction via an elastic member.

* * * * *